(No Model.)
A. ARTER & W. R. KNOWLES.
HARNESS SADDLE.
No. 318,848. Patented May 26, 1885.
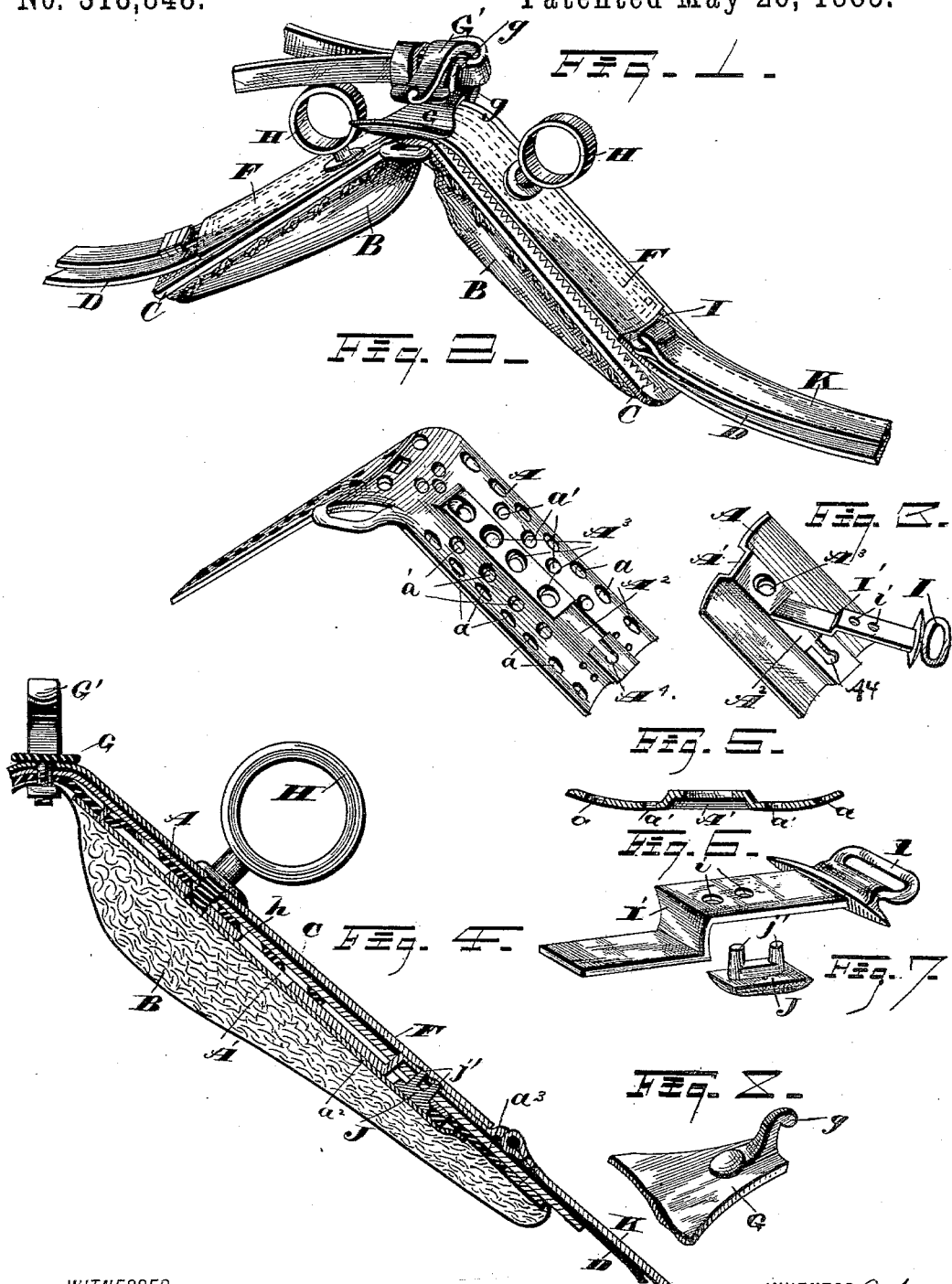
WITNESSES
Wm. M. Monroe.
Geo. W. King.
INVENTOR
William R. Knowles
Alpheus Arter
by
Leggett & Leggett
Attorneys

UNITED STATES PATENT OFFICE.

ALPHEUS ARTER, OF NEW LISBON, AND WILLIAM R. KNOWLES, OF COLUMBIANA, OHIO.

HARNESS-SADDLE.

SPECIFICATION forming part of Letters Patent No. 318,848, dated May 26, 1885.

Application filed February 24, 1885. (No model.)

*To all whom it may concern:*

Be it known that we, ALPHEUS ARTER and WILLIAM R. KNOWLES, respectively of New Lisbon and Columbiana, in the county of Columbiana and State of Ohio, have invented certain new and useful Improvements in Harness-Saddles; and we do hereby declare the following to be a full, clear, and exact description of the invention, such as will enable others skilled in the art to which it pertains to make and use the same.

Our invention relates to improvements in harness or so-called "gig-saddles," the object being to provide a metal tree that is attached to and forms a cover for the pad, with suitable holes in the tree for such attachment, and a raised portion through the center of the tree, forming a groove underneath for the nut of the terrets and other locking attachments.

A further object is to provide an improved locking device for securing the shaft-bearing strap.

A further object is to provide an upwardly-projecting lug integral with the seat, that serves as a guard to prevent the check from unhooking.

Our invention also relates to the details of construction hereinafter described.

In the accompanying drawings, Figure 1 is a view in perspective of our improved harness-saddle. Fig. 2 is a view in perspective of the tree. Fig. 3 is a view in perspective of the lower portion of leg of the tree, showing also the fastening device for the thill-strap in the position to enter the tree. Fig. 4 is an elevation in longitudinal section of one part of the saddle. Fig. 5 is a transverse section of the tree. Fig. 6 is an enlarged view of the fastening device for the thill-tugs. Fig. 7 is a view in perspective of a locking device that is attached to part shown in Fig. 6. Fig. 8 is a view in perspective of the seat.

A represents the tree; B, the pad; C, the housing; D, the skirt; F, the jockey, and G the seat.

The tree is preferably of malleable cast-iron, and has holes $a$ along the edges for attaching the pad, and these edges curve upward and outward in cross-section, as shown in Fig. 5, by means of which the tree conforms somewhat to the shape of the pad, and the latter is more easily attached; also the tree is made stiffer and stronger by reason of the said curvature. A second row of holes, $a'$, are to save metal and lighten the tree. The central portion, along the legs of the tree, is raised, leaving a channel, A', underneath, that forms a seat for the nuts of the terrets and other fastenings hereinafter described. A square or rectangular opening, $A^2$, is had in the raised part, through which the nuts and other fastenings are inserted, and several holes, $A^3$, are provided for the shanks of the terrets, so that the latter may be located in the desired position. A strip, $a^2$, of thin metal, leather, or other suitable material, is laid along under the channel A', and is secured at the ends to the tree, and prevents the hair or other stuffing of the pad from entering the said channel. As aforesaid, the pad is attached directly to the tree, and the latter, so far as it extends, forms a cover for the pad, by means of which a considerable saving is had, the usual construction of pads requiring a leather cover the entire length thereof. Below the ends of the tree the pad is covered in the usual manner by a cover, $a^3$, and this cover is also secured to the end of the tree. The lower ends of the pad are therefore flexible, and may conform to the shape of the horse. Heretofore the tree has usually been secured between the skirt and jockey, and the latter had to be stitched on by hand. With our improved device the housing, skirt, and jockey are all stitched together, and this can be done on a machine, thereby reducing the initial cost of the same. The housing, skirt, and jockey are next laid on the tree, (the pad having been previously attached to the tree, as aforesaid,) the seat G and the check-rein hook G' are placed in position, and the parts secured in the usual manner by screws passing up through the tree and screwing into the seat, passing, of course, through the housing, skirt, and jockey, so that all of these parts are firmly secured at this point. A lug, $g$, integral with the seat, extends upward a suitable distance, more or less, according to the curve of the hook G', and serves as a guard to prevent the check-rein from unhooking. The shank of the terrets H pass through the jockey, skirt, and housing, and enter, respectively, nuts $h$ in the channel $A'$, and secure the parts at this point.

The device for securing the thill-strap or bearers is as follows: The loop I, to which the thill-bearer K is attached, has a flat thin shank, with a square offset at $I'$, and holes $i$, that correspond with the teats $j$ on the part J. An end view of the part J and teats resembles an inverted T. Transverse slits are cut in the skirt and housing, and the shank of the part I is inserted until the offset portion $I'$ extends through these slits, in which position the loop part is on top of the skirt and the end of the shank is under the housing. Next, the part J is placed in position, the teats $j$ passing up through holes previously punched in the skirt and housing, and through the holes $i$, where they are riveted, with the bottom of the head J flush with the bottom of the shank beyond the offset, and one end of the head J abutting against the offset. By bending the skirt and housing the part I may be brought in the position shown in Fig. 3, and the end of the shank inserted in the opening $A^2$. The end of the shank is passed up under the tree in the channel $A'$ until the part J is in the opening $A^2$. The loop end is then depressed and drawn down endwise, the head J passing under the raised portion of the tree, and the teats $j$ between the head and housing entering the slot $A^4$, that extends downward from the opening $A^2$. In this position the part I is securely locked and the skirt and housing are held in place. When the parts are arranged as aforesaid, the end of the jockey covers the riveted ends of the teats $j$.

By moving the loop first upward and then outward the device may at any time be readily uncoupled, after which, by unscrewing the terret, the nut $h$ may be removed and replaced with a new one, if necessary, or the terret may be changed to a different hole, $A^3$, if preferred. By further unscrewing the seat the parts may be separated so that they are all accessible for repairs or cleaning.

This harness-saddle is convenient and serviceable, and may be furnished at a small initial cost.

What we claim is—

1. In a harness-saddle, the combination, with a metal tree with edges curved outward and upward, and holes along the edges, and a raised central part forming a channel underneath, of a pad secured to the tree, the latter, as far as it extends, forming a cover for the pad, and a strip between the pad and channel, substantially as set forth.

2. In a harness-saddle, the combination, with a tree, as described, and a pad attached thereto, of the hook I with offset, shank, and part J secured thereto, arranged to lock in the tree, substantially as set forth.

3. In a harness-saddle, the combination, with a tree, as described, and a pad attached thereon, of a housing, skirt, and jockey so arranged that these latter three parts may be stitched together and completed before they are applied to the tree, substantially as set forth.

In testimony whereof we sign this specification, in the presence of two witnesses, this 3d day of February, 1885.

ALPHEUS ARTER.
WILLIAM R. KNOWLES.

Witnesses to signature of Alpheus Arter:
  JAMES G. MOORE,
  HARVEY MORRISON.

Witnesses to signature of William R. Knowles:
  BERTRAM RENKENBERGER,
  WALTER HOLLOWAY.